US007933797B2

(12) United States Patent
Sorensen

(10) Patent No.: US 7,933,797 B2
(45) Date of Patent: *Apr. 26, 2011

(54) PURCHASE SELECTION BEHAVIOR ANALYSIS SYSTEM AND METHOD

(75) Inventor: Herb Sorensen, Corbett, OR (US)

(73) Assignee: Shopper Scientist, LLC, Corbett, OR (US)

( * ) Notice: Subject to any disclaimer, the term of this patent is extended or adjusted under 35 U.S.C. 154(b) by 1368 days.

This patent is subject to a terminal disclaimer.

(21) Appl. No.: 11/364,356

(22) Filed: Feb. 27, 2006

(65) Prior Publication Data

US 2006/0200378 A1 Sep. 7, 2006

Related U.S. Application Data

(63) Continuation-in-part of application No. 10/115,186, filed on Apr. 1, 2002, now Pat. No. 7,006,982, and a continuation-in-part of application No. 10/667,213, filed on Sep. 19, 2003, now Pat. No. 7,606,728, and a continuation-in-part of application No. 11/179,306, filed on Jul. 11, 2005.

(60) Provisional application No. 60/291,747, filed on May 15, 2001, provisional application No. 60/291,746, filed on May 15, 2001, provisional application No. 60/412,389, filed on Sep. 20, 2002, provisional application No. 60/586,792, filed on Jul. 9, 2004.

(51) Int. Cl.
*G06F 17/10* (2006.01)
(52) U.S. Cl. .............................. 705/10; 705/7
(58) Field of Classification Search ...................... 705/10
See application file for complete search history.

(56) References Cited

U.S. PATENT DOCUMENTS 5,227,874 A * 7/1993 Von Kohorn ..................... 705/10
(Continued)

FOREIGN PATENT DOCUMENTS

JP 2001-331875 A 11/2001
(Continued)

OTHER PUBLICATIONS

Underhill, Paco, "Why We Buy: the science of shopping", Obat, Inc., 1999.*

(Continued)

*Primary Examiner* — Lynda C Jasmin
*Assistant Examiner* — Thomas Mansfield
(74) *Attorney, Agent, or Firm* — Alleman Hall McCoy Russell & Tuttle LLP

(57) ABSTRACT

A market research method is provided, the method including analyzing shopper path data representing a plurality of shopper paths through a store. The analysis typically include, at predetermined time intervals, for each of a plurality of shoppers traveling through the store, and for each of one or more displays positioned in the store: determining a simulated line of sight for each shopper; calculating a distance from each shopper to the display; calculating a time of exposure of the shopper to the display; calculating a peripheral angle of the display from the shoppers simulated line of sight; and calculating a rotation angle of the display relative to the shopper's simulated line of sight. Further, the method may also include, for each of the one or more displays, calculating a visibility measure based on the time of exposure, distance, peripheral angle and rotational angle measured at each of the time intervals, for each of the plurality of shoppers. The method may further include calculating a rating points measure for each display, based on the visibility measure for each display.

21 Claims, 12 Drawing Sheets

U.S. PATENT DOCUMENTS

| | | | |
|---|---|---|---|
| 5,287,266 | A | 2/1994 | Malec et al. |
| 5,305,197 | A | 4/1994 | Axler et al. |
| 5,541,835 | A | 7/1996 | Dextraze et al. |
| 5,630,068 | A | 5/1997 | Vela et al. |
| 5,821,513 | A | 10/1998 | O'Hagan et al. |
| 5,910,769 | A | 6/1999 | Geisler |
| 5,918,211 | A | 6/1999 | Sloane |
| 5,974,396 | A | 10/1999 | Anderson et al. |
| 6,011,487 | A * | 1/2000 | Plocher .................... 340/825.49 |
| 6,317,718 | B1 | 11/2001 | Fano |
| 6,381,583 | B1 | 4/2002 | Kenney |
| 6,388,688 | B1 | 5/2002 | Schileru-Key |
| 6,421,080 | B1 | 7/2002 | Lambert |
| 6,659,344 | B2 * | 12/2003 | Otto et al. ..................... 235/381 |
| 6,820,062 | B1 | 11/2004 | Gupta et al. |
| 6,836,773 | B2 | 12/2004 | Tamayo et al. |
| 7,006,982 | B2 * | 2/2006 | Sorensen ......................... 705/10 |
| 2003/0039379 | A1 * | 2/2003 | Gutta et al. ................... 382/116 |

FOREIGN PATENT DOCUMENTS

| | | |
|---|---|---|
| JP | 2003-016243 A | 1/2003 |
| WO | WO 99/14694 | 3/1999 |

OTHER PUBLICATIONS

Shun Yin Lam, "Uncovering the Multiple Impacts of Retail Promotion on Apparel Store Performance"; Dec. 1997; The University of Western Ontario, London, Ontario, Canada.

Osmar R. Zaïane et al.; "Discovering Web Access Patterns and Trends by Applying OLAP and Data Mining Technology on Web Logs"; Simon Fraser University, Burnaby, BC, Canada; 11 Pgs.

Peter R. Peacock; "Data Mining in Marketing"; Marketing Management; Winter 1998; vol. 6, No. 4, pp. 8-18.

Dan R. Greening, "Tracking Users"; Web Techniques, Jul. 1999, vol. 4, No. 7; pp. 50-58.

Paco Underhill,"Why We Buy: The Science of Shopping"; Simon & Schuster, 1999, ISBN: 0-684-84913-5, 31 Pgs.

Keith Hammonds, "How We Sell"; Nov. 1999; Fast Company, Issue 29, p. 294, http://pf.fastcompany.com/magazine/29/sell.html.

Jaideep Srivastava, et al., "Web Usage Mining: Discovery and Applications of Usage Patterns from Web Data"; ACM SIGKDD Explorations, Jan. 2000, University of Minnesota, Minneapolis, MN, USA, 12 Pgs.

www.premierecarts.com—Shopping cart manufacturer web site archived on Aug. 17, 2000.

Envirosell.com—Research Report, Sample Retail Report, Articles about Envirosell web pages, 1999-2000.

Gaynor, Mark; "Hidden Cameras Reveal Human Side of P-O-P Story"; P-O-P Times, 1999.

* cited by examiner

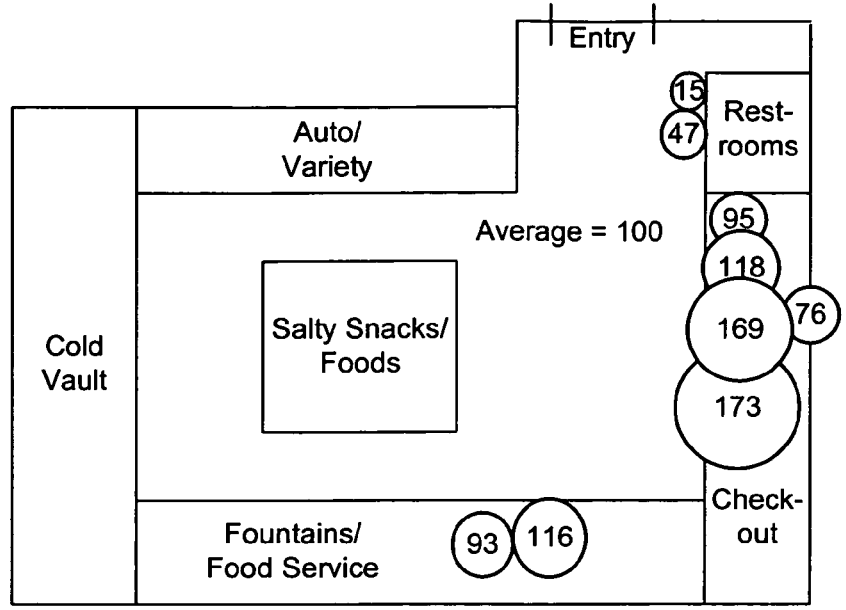

Fig. 18

| PP | Display | Size (sq ft) | X | Y | Visibility Measure (EyeShare) | Index | GRP* | 1 Store GRP** | National GRP*** | |
|----|---------|---|---|---|---|---|---|---|---|---|
| 1 | 1st right of entry | 4 | xx | xx | 35 | 15 | 175 | 9387 | 0.2 | |
| 2 | 2nd right of entry | 4 | xx | xx | 110 | 46 | 550 | 29502 | 0.7 | |
| 3 | 1st order counter | 3 | xx | xx | 225 | 95 | 1125 | 60345 | 1.5 | |
| 4 | 2nd order counter | 2 | xx | xx | 280 | 118 | 1400 | 75096 | 1.9 | |
| 5 | 3rd order counter | 1 | xx | xx | 400 | 169 | 2000 | 107280 | 2.7 | |
| 6 | 4th order counter | 4 | xx | xx | 410 | 173 | 2050 | 109962 | 2.7 | |
| 7 | menu board | 14 | xx | xx | 180 | 76 | 900 | 48276 | 1.2 | |
| 8 | right soda | 2 | xx | xx | 275 | 116 | 1375 | 73755 | 1.8 | |
| 9 | left soda | 2 | xx | xx | 220 | 93 | 1100 | 59004 | 1.5 | |
| | | | | Store Average | 237 | 100 | 10675 | 572605 | 14.3 | Sums |

Assumptions
*(5 seconds/5 feet ^2) = 1 GRP ---> 1 ES = 5 GRP
**522 observed trips in 28 days with 1000 shoppers per day
***5000 stores with an adult population of 200,000,000

Fig. 19

PURCHASE SELECTION BEHAVIOR ANALYSIS SYSTEM AND METHOD

CROSS-REFERENCE TO RELATED APPLICATIONS

This application is a continuation-in-part of U.S. application Ser. No. 10/115,186, entitled "PURCHASE SELECTION BEHAVIOR ANALYSIS SYSTEM AND METHOD," filed on Apr. 1, 2002 now U.S. Pat. No. 7,006,982, which in turn claims priority to U.S. Provisional App. Ser. No. 60/291,747, entitled "PURCHASE SELECTION BEHAVIOR ANALYSIS SYSTEM BASED ON LINKED PURCHASE RECORDS AND SHOPPING PATH CHARACTERISTICS," filed on May 15, 2001, and to U.S. Provisional App. Ser. No. 60/291,746, entitled "CONSTRAINED STATISTICALLY ENHANCED LOCATION AND PATH ANALYSIS SYSTEM," filed on May 15, 2001. This application is also a continuation-in-part of U.S. application Ser. No. 10/667,213, entitled SHOPPING ENVIRONMENT ANALYSIS SYSTEM AND METHOD WITH NORMALIZATION, filed Sep. 19, 2003 now U.S. Pat. No. 7,606,728, which in turn claims priority to provisional patent application, Ser. No. 60/412,389, entitled "SHOPPING ENVIRONMENT ANALYSIS SYSTEM AND METHOD," filed on Sep. 20, 2002 and to U.S. patent application, Ser. No. 10/115,186, listed above. This application is also a continuation-in-part of U.S. application Ser. No. 11/179,306, entitled SYSTEM AND METHOD FOR MODELING SHOPPING BEHAVIOR, filed on Jul. 11, 2005, which in turns claims priority to provisional patent application, Ser. No. 60/586,792, entitled "SYSTEM AND METHOD FOR MODELING SHOPPING BEHAVIOR IN STORES WITH CENTER OF STORE AISLES," filed on Jul. 9, 2004. The entire disclosure of each of these applications is herein incorporated by reference.

TECHNICAL FIELD

The present invention relates generally to a marketing analysis system, and more particularly to a marketing analysis system based upon tracking shoppers and purchases in a shopping environment.

BACKGROUND

A wide variety of goods are sold to consumers via a nearly limitless array of shopping environments. Manufacturers and retailers of these goods often desire to obtain accurate marketing information concerning the customers' shopping habits, in order to more effectively market their products, and thereby increase sales.

One prior method of obtaining data on a shopper's habits is to have the shopper fill out a survey. However, customers may give inaccurate responses to survey questions, either due to forgetfulness, laziness, or deceit, may not understand the survey questions, or may not take the time to fill out a survey at all. Thus, the survey data may not accurately reflect the shopper's habits. This results in skewed survey data that misinforms the manufacturers and retailers, leading to misdirected and ineffective marketing efforts by the manufacturers and retailers.

It would be desirable to provide a system and method for inexpensively gathering accurate data related to the shopping habits of shoppers.

SUMMARY

A system, method, data compilation, and storage medium for analyzing shopper behavior of one or more shoppers within a shopping environment is provided. The method includes, determining the position of a product within the shopping environment, tracking a shopper path of a shopper through the shopping environment, via a wireless tracking system, and calculating a product-shopper proximity measure based at least in part, on a physical distance of a shopper traveling along the shopping path, from the position of the product.

According to another aspect of the invention, the method typically includes providing a shopping environment including products placed at predetermined locations in the shopping environment; tracking a shopper path of a shopper through the shopping environment; detecting that the shopping path is within a predefined region relative to a product; and determining a shopping behavior of a shopper within the predefined region.

The system typically includes a wireless tracking system configured to track the position of one or more shopper transmitters within a shopping environment having one or more products placed at predetermined locations therein; and a data analyzer configured to receive data from the wireless tracking system and reconstruct a shopper path based on the data. The data analyzer further is configured to analyze the shopper path in comparison to the locations of the products within the shopping environment, and, for each product, determine a product-shopper proximity measure based on a physical distance between the shopper traveling along the shopping path and/or a simulated visibility of the product from the line of sight of a shopper traveling along the shopping path.

The data compilation typically includes a measure that a shopper path of a shopper within a shopping environment is within a predefined region adjacent a product positioned in the shopping environment, and a determination of a shopping behavior of the shopper within the predefined region.

The storage medium typically is readable by a computer and has a program of instructions embodied therein that is executable by the computer to perform the steps of: providing a shopping environment including products placed at predetermined locations in the shopping environment; tracking a shopper path of a shopper through the shopping environment; detecting that the shopping path is within a predefined region relative to a product, wherein the predefined region is a region from which the shopper on the shopping path can see the product or a region within a predetermined physical proximity to the product; and determining a shopping behavior of a shopper within the predefined region, wherein the shopping behavior is selected from the group consisting of the shopper being physically present within the predefined region, the shopper slowing down within the predefined region, the shopper stopping within the predefined region, and the shopper purchasing a product within the predefined region.

According to another aspect of the invention, a market research method including analyzing shopper path data representing a plurality of shopper paths through a store. The analysis typically include, at predetermined time intervals, for each of a plurality of shoppers traveling through the store, and for each of one or more displays positioned in the store: determining a simulated line of sight for each shopper; calculating a distance from each shopper to the display; calculating a time of exposure of the shopper to the display; calculating a peripheral angle of the display from the shoppers simulated line of sight; and calculating a rotation angle of the display relative to the shopper's simulated line of sight. Further, the method may also include, for each of the one or more displays, calculating a visibility measure based on the time of exposure, distance, peripheral angle and rotational angle measured at each of the time intervals, for each of the plurality of shoppers. The method may further include calculating a rating points measure for each display, based on the visibility measure for each display.

BRIEF DESCRIPTION OF THE DRAWINGS

FIG. 18 is a schematic view of a store, with graphical balloon overlays indicating ratings points for a plurality of displays calculated according to the method of FIG. 12.

FIG. 19 is a table containing data for the store of FIG. 16, calculated according to the method of FIG. 12.

DETAILED DESCRIPTION

Figure 1:
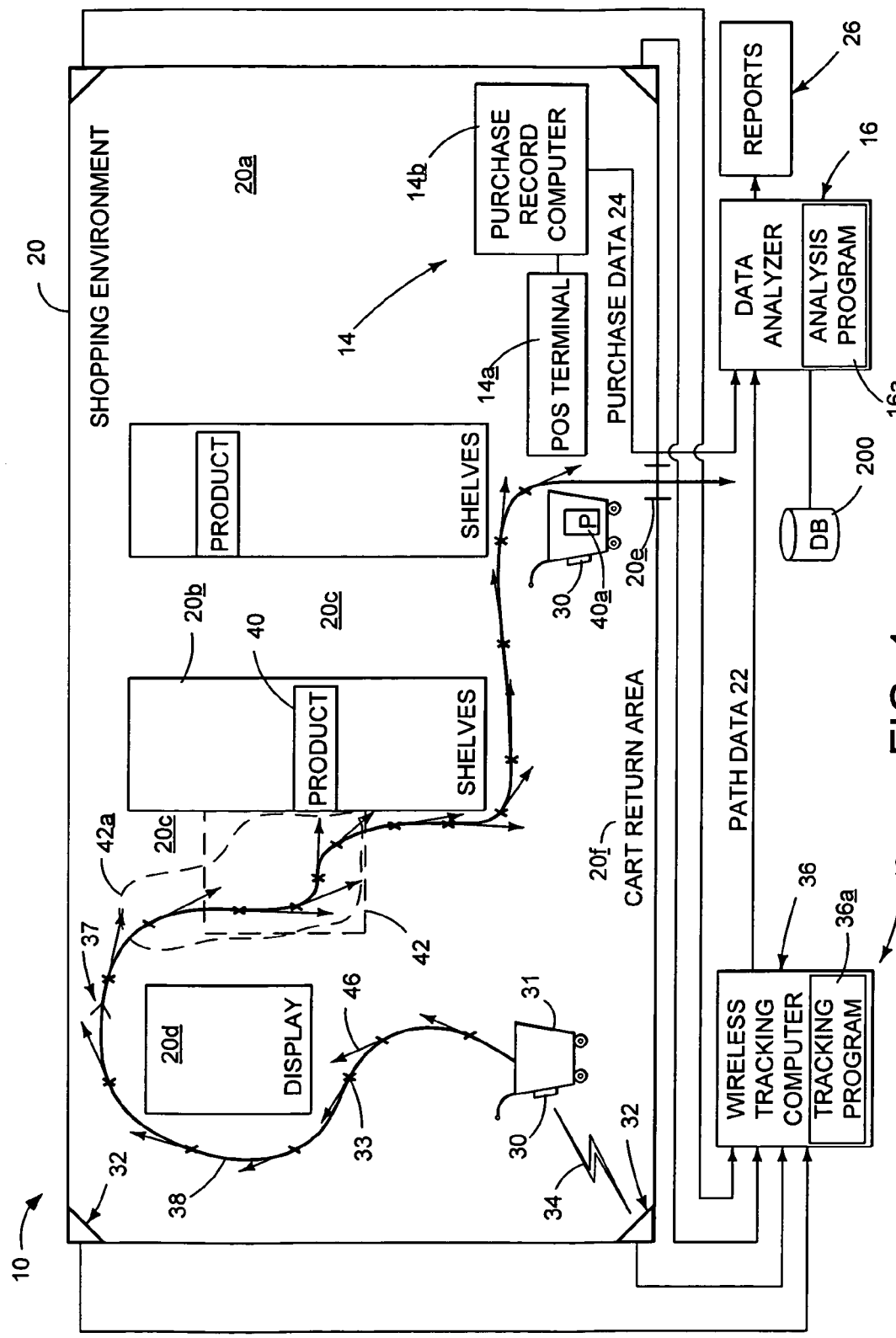
FIG. 1 is a schematic view of a system for collecting shopping behavior data according to one embodiment of the present invention.

FIG. 1 shows a purchase selection behavior analysis system according to one embodiment of the present invention generally at 10. System 10 typically includes a wireless tracking system 12 configured to monitor the position of a shopper and to transmit shopper path data 22 to a data analyzer 16, as well as a purchase record system 14 configured to identify, record and transmit purchase data 24 to data analyzer 16. Data analyzer 16 is configured to determine one or more shopping behaviors attributable to the particular shopper, based on path data 22 and purchase data 24. Data analyzer 16 is further configured to create a data compilation 26, or report 26, of these behaviors, based upon the path data and purchase data, such as reports 102, 103, described below. Typically the shopping environment is a retail store, such as a grocery store.

Wireless tracking system 12 is typically a local positioning system (LPS) that includes transmitters 30 configured to emit tracking signals that are received by transceivers 32 and transmitted to a wireless tracking computer 36. Transceivers 32 may alternatively be receivers 32. The tracking signal may contain a unique transmitter identifier, and a tracking program 36a executed on the wireless tracking computer may be configured to resolve the position of the transmitter by examining relative strength and/or time differences in the signals received at each of the transceivers. Alternatively, the tracking signal may contain position information, such as coordinates resolved using a Local Positioning System receiver or other tracking system component. The transmitters and transceivers are typically configured to send and receive radio frequency signals, however, it will be appreciated that optical signals, infrared signals, or other forms of tracking signals may also be used.

Transmitters 30 typically transmit a tracking signal 34 every 4 seconds, but alternatively may transmit at virtually any other time interval suitable for tracking a shopper, including continuously. It will be appreciated that transceivers 32 are typically located at the perimeter of the shopping environment, but alternatively may be located in any suitable position to receive tracking signal from transmitters 30, including other positions in the store or even outside the shopping environment.

Each transmitter 30 is typically attached to a shopping cart 31, which may be a hand-held, push-type or other cart. Because the motion of the cart and shopper substantially correspond, the shopper path may be tracked by tracking the motion of the transmitter on the cart. Alternatively, the transmitter may be attached directly to a shopper, for example, via a clip or other attachment mechanism, or to some other form of customer surrogate, such as a coupon, clipboard, or other handheld device.

As the shopper travels with cart 31 around shopping environment 20, transceivers 32 receive periodic tracking signals 34 from the transmitter 30 and forward the tracking signals 34 to wireless tracking computer 36. Wireless tracking computer 36 is configured to reconstruct a shopper path 38 based on the tracking signals and to transmit path data 22 to data analyzer 16. The path data is typically in the form of path records, 202, discussed below.

Shopping environment 20 includes a selling floor 20a configured with shelves 20b that carry products 40, and partition the floor into aisles 20c. Shopping environment 20 may also include displays 20d positioned at various locations on the shopping floor. Shopping environment 20 also typically includes an entrance/exit 20e, and a cart return area 20f.

Returning to FIG. 1, typically transceivers 32 are hardwired to wireless tracking computer 36, but alternatively may be configured in virtually any way suitable for transmission of tracking signal 34 from the transceivers 32 to wireless tracking computer 36. Wireless tracking computer 36 typically is a separate computer from data analyzer 16, but may be the same machine as data analyzer 16 or of virtually any other configuration suitable for reconstructing shopper path 38. Wireless tracking computer 36 is typically hardwired to data analyzer 16, but may be of virtually any other configuration that allows path data 22 to be transferred or used by data analyzer 16.

Figure 11:
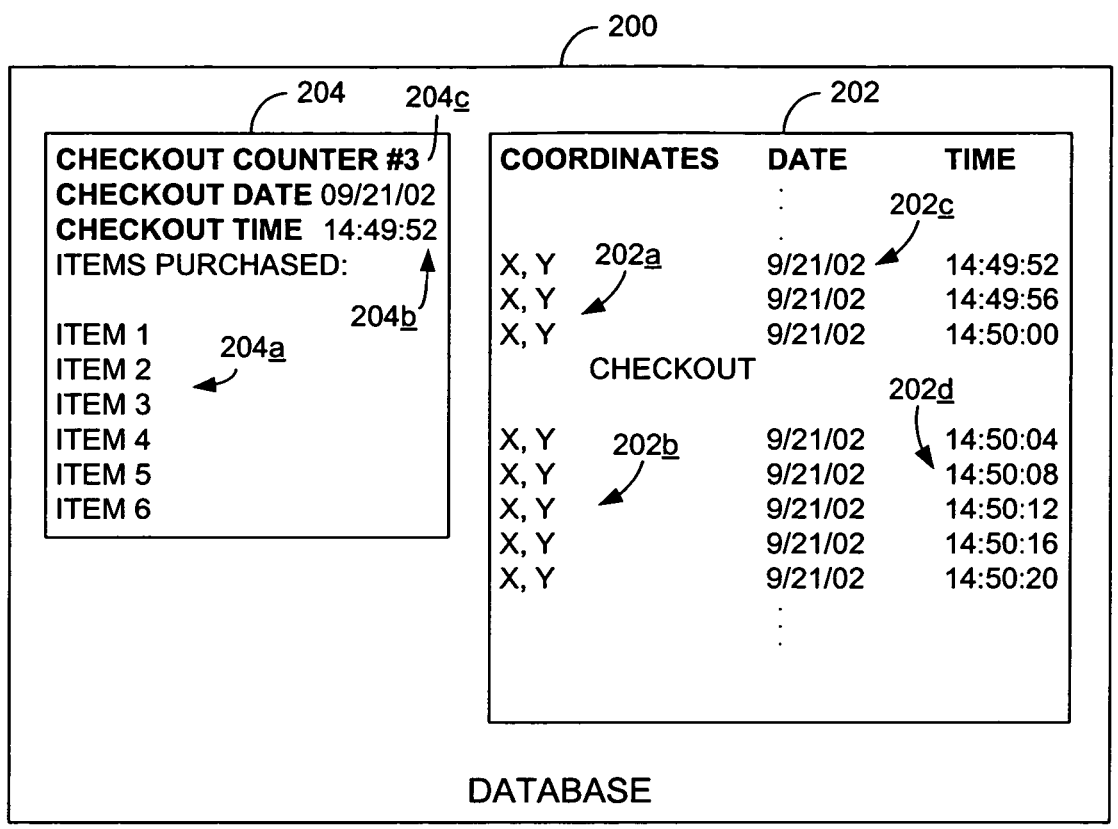
FIG. 11 is a schematic view of a path record and a purchase record utilized by the data analyzer of the system of FIG. 1.

Typically, shopping path 38 is reconstructed by analyzing a plurality of detected tracking signals 34 over time, and calculating a series of positions 33 of the transmitter throughout the shopping environment 20. As shown in FIG. 11, the series of positions is typically represented by an array of coordinate pairs in a path record 202. Typically a shopper path is determined to have started when motion of a particular transmitter is detected near a cart return area near the entrance of the shopping environment. To determine where one shopping path ends, data analyzer 16 is typically configured to detect whether the position of the transmitter is adjacent point of sale terminal 14a of purchaser record system 14, indicating that the shopper is at the check out counter, purchasing items. Alternatively, the cart may have a barcode or tag that can be scanned by the point of sale terminal or other scanner to link the shopper path and the purchase record. Alternatively, these functions may be performed by a tracking program 36a on wireless tracking computer 36.

Shopper path 38 is typically reconstructed by wireless tracking computer 36 (or alternatively by data analyzer 16) by connecting the series of positions 33, and smoothing the resultant polygonal line. Suitable methods for use in reconstructing the shopping path are described in co-pending U.S. provisional patent application Ser. No. 60/291,746, filed May 15, 2001, entitled "Constrained Statistically Enhanced Location and Path Analysis System," the entire disclosure of which is herein incorporated by reference.

For each position along shopper path 38, data analyzer 16 is configured to calculate a line of sight 46, which is typically tangent to the shopper path and facing in the direction of a velocity vector at that point on the shopper path. Typically, the line of sight is calculated in two dimensions, however, it will be appreciated that the line of sight may be calculated in three dimensions and may take into account banners, displays and other objects placed within shopping environment 20.

Figure 3:
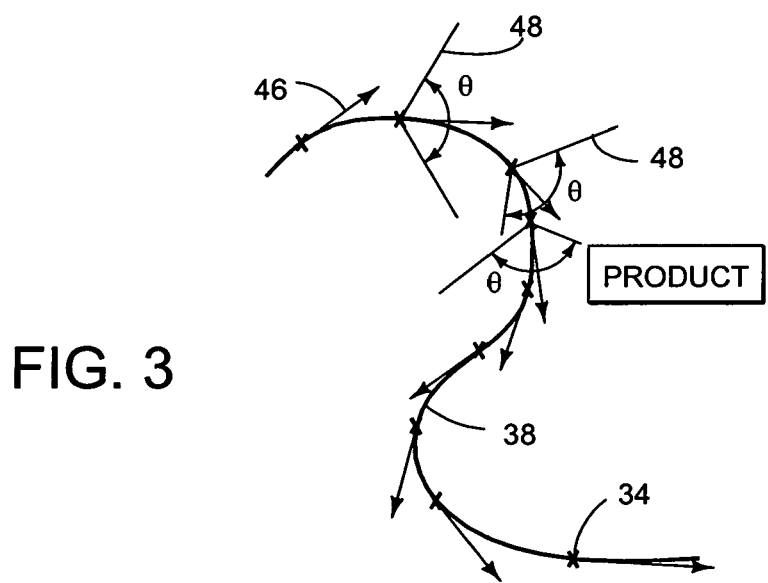
FIG. 3 is a schematic view showing the relationship between a shopper path and lines of sight from a plurality of positions along the shopper path.
Figure 4:
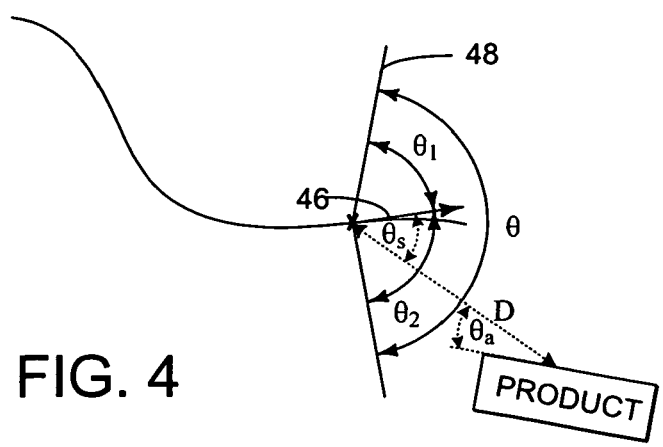
FIG. 4 is a schematic view of the field of vision of a shopper traveling along a shopping path.

Further, for each position along shopper path 38, data analyzer 16 is configured to calculate a field of view 48 facing in the direction of travel of the shopper. As shown in FIGS. 3-4, field of view 48 is typically calculated by determining an angle $\theta$, which represents the angular breadth of the shopper's field of view. Angle $\theta$ is composed of constituent angles $\theta_1$ and $\theta_2$. Where $\theta$ is centered along the line of sight 46, $\theta_1$ and $\theta_2$ are typically equal. Alternatively, field of view $\theta$ may not be centered on the line of sight, and angles $\theta_1$ and $\theta_2$ may be different. Angle $\theta$ typically ranges from about zero to about 180 degrees. According to one embodiment of the invention, Angle $\theta$ is less than about 90 degrees, and according to another embodiment angle $\theta$ is less than about 45 degrees.

System 10 further includes a purchase record system 14 having a plurality of Point-of-sale (POS) terminals 14a and a purchase record computer 14b. POS terminal 14a is configured to identify and record purchased products 40a, thereby generating a purchase record 204 (shown in FIG. 11) for each shopper. Point-of-sale terminal 14a typically includes a scanner and cash register, but may alternatively include virtually any other components configured to identify and record purchased products. These purchase records are sent as purchase data 24, via purchase record computer 14b, to data analyzer 16. Purchase record system 14 is typically hardwired to data analyzer 16, but may be of virtually any other configuration that allows transmission of purchase data 24 to data analyzer 16. As shown in FIG. 11, each purchase record 204 of purchase data 24 typically includes a list of items 204a along with a date and a time 204b of checkout, as well as a POS terminal identifier 204c. The purchase record 24 is typically stored in a database 200 associated with the data analyzer, along with path records 202 received from wireless tracking system 12, discussed below.

Data analyzer 16 receives path data 22 from wireless tracking system 12 and purchase data 24 from point-of-sale terminal 14 and determines which particular path data corresponds to which particular purchase data 24. The path data 22 typically contains a plurality of path records, and the purchase data typically contains a plurality of purchase records, each of which are stored in database 200. Data analyzer 16 includes an analysis program 16a configured to link purchase records 204 from purchase record system 14 with path records 202 from wireless tracking system 12. The linking of information from systems 12 and 14 provides an objective set of data corresponding to each shopping path 38. Typically, the analysis program 16a is configured to examine the checkout time 204b and checkout location (i.e. POS terminal ID) against the path records and determine the path that has a position adjacent the POS terminal at the same time the purchase record was generated, to thereby match the path and purchase records. Alternatively, the cart or transmitter itself is scanned at checkout, and the analysis program 16a is configured to detect a transmitter/cart identifier and checkout time associated with a particular purchase record, in order to link the shopper path and purchase record.

Further, information from customer account, such as a frequent shopper card account or discount card account may be linked to the path data and the purchase data. Typically, a shopper's frequent shopper or discount card is read by the point of sale terminal at the time of checkout, and linked with the purchase data and path data. The frequent shopper or discount card may be linked to an associated database record containing historic purchase data, demographic data, or other information associated with a particular frequent shopper or discount card. Data analyzer 16 may be configured to store a plurality of shopping paths recorded on multiple shopping trips taken by the owner of each frequent shopping or discount card. Thus, the data analyzer may be configured to compare the shopping paths for a particular frequent shopper or discount card over an extended period of time. The data analyzer may also be configured to impute or predict a path in the same or a different shopping environment for a particular shopper based at least in part on the historic shopper path data from prior shopping trips linked to the frequent shopping or discount card. Thus, data analyzer may be used to predict the effectiveness of a display location, without actually positioning the display in the shopping environment and collecting new shopper data.

In addition to imputing shopper paths, data analyzer 16 is also typically configured to derive many different shopping behaviors based upon the path and purchase data. These shopping behaviors include, but are not limited to the behaviors 108 described below with reference to FIG. 8.

A plurality of products 40 typically are positioned at predetermined locations within shopping environment 20. Data analyzer 16 is configured to recognize a predefined region 42 relative to each product 40. Predefined region 42 may also be referred to as a zone, and may have one or more subzones. Typically the product is located within the predefined region 42, and the predefined region extends around the product by a distance R, which may be constant, or more typically, variable. The predefined region may alternatively be adjacent the product or separated by some predetermined distance from the product. The predefined region may be virtually any shape suitable for detecting meaningful shopper behaviors. For example, the predefined region may be rectangular, curved, polygonal, etc.

The predefined region alternatively may be defined by the field of view 48 for a shopper traveling along a given path 38, as shown at 42a. Predefined region 42a is thus defined as the region from which the product 40 is within the shopper's field of view when traveling along a particular shopping path.

Product-shopper visibility measure 44 is a measure of how long a product is visible to a shopper as a shopper travels along shopper path 38. The visibility measure is calculated using lines of sight 46, which face in the direction of travel of the shopper and simulate a direction that a shopper is looking as the shopper travels along shopper path 38.

Figure 2:
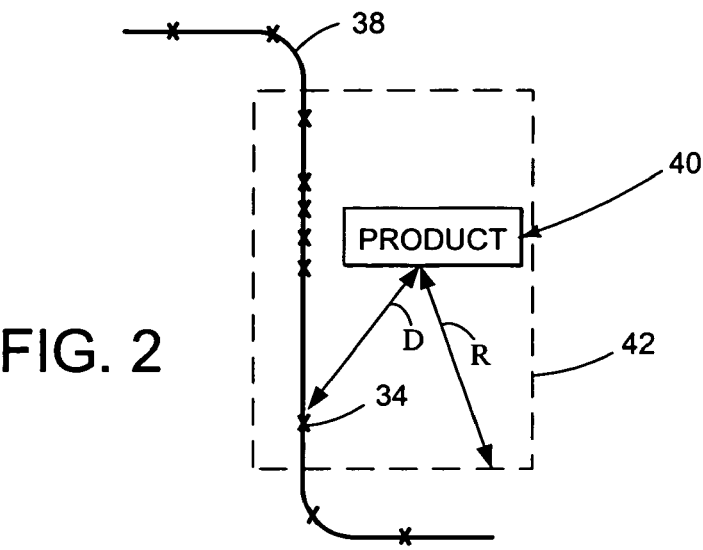
FIG. 2 is a schematic view showing a shopper path traveling through a predefined region adjacent a product.

FIG. 2 shows a predefined region 42 adjacent a product 40. The depicted shopper path 38 travels through the predefined region, and the shopper is detected at positions 33 that are closely spaced immediately next to the product. Because the tracking signals 34 are typically emitted by a transmitter at regular intervals, such as every four seconds, the distance between detected positions 33 typically indicates the speed of a shopper along shopper path 38. Thus, it can be determined, for example, that the shopper slowed down adjacent the product in FIG. 2, within the predefined region. After passing the product, the greater distance between the tracking signal indicates that a shopper has increased speed.

FIG. 3 shows a detail view of a line of sight 46 of a shopper on shopper path 38 as a shopper travels near product 40. Line of sight 46 is typically calculated as discussed above, and, along with field of view 48, also discussed above, simulates a direction in which a shopper may be looking as the shopper travels along shopper path 38. It may be useful to provide information about how long a product is within the line of sight or field of view of a shopper when each shopper is in a store, because a shopper may be more likely to buy a particular product if that product is visible to a shopper for a longer period of time. Further, if a shopper does not see a particular product, a shopper may be less likely to purchase that product. Therefore, it may increase sales of a particular product to position that product such that it is seen for longer periods of time by more shoppers.

Figure 5:
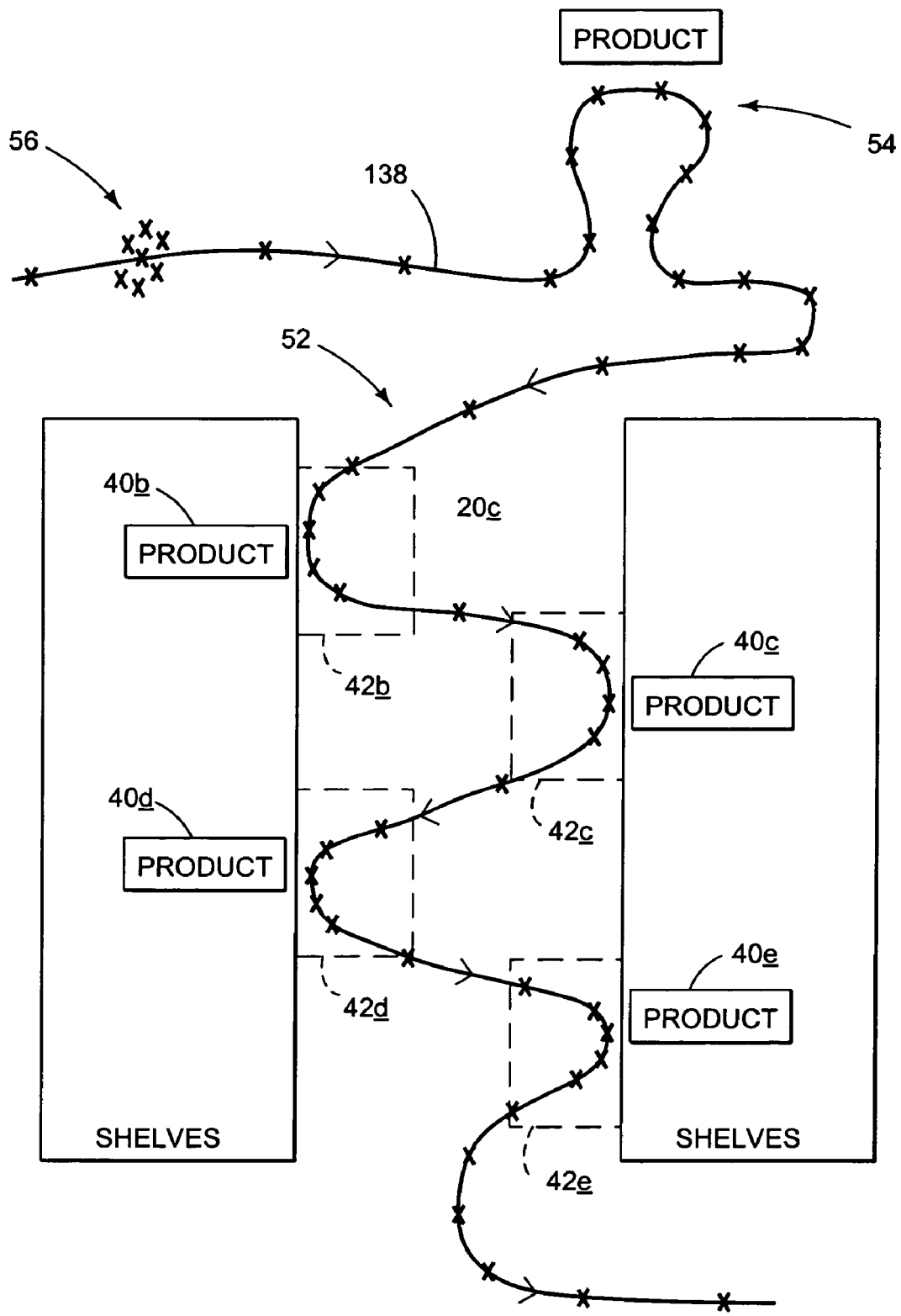
FIG. 5 is a schematic view of a shopper path exhibiting a loiter pattern, an excursion pattern, and a back and forth aisle-traverse pattern.

FIG. 5 depicts a shopper path featuring a plurality of patterns that data analyzer 16 is configured to recognize, including an aisle-traverse pattern 52, an excursion pattern 54, and a loitering pattern 56. Aisle-traverse pattern 52 is formed when a shopper travels the full length of an aisle, that is, enters an aisle through a first end and exits the aisle through an opposite end, fully traversing the aisle. The aisle-traverse pattern shown in FIG. 5 further includes a back-and-forth motion during which products 40b, 40c, 40d, 40e alternately come into the shopper's field of view. While traveling along this path, the shopper passes through predefined regions 42b, 42c, In FIG. 7, a shopper path is shown with two aisle-traverse patterns 52 that do not feature any back and forth motion.

Excursion pattern 54 is formed when a shopper abruptly changes direction, and travels for a short distance, only to return and resume the original direction of travel, such as when a shopper makes a short trip to retrieve a desired product. An excursion pattern may also be defined as the pattern formed when a shopper path enters and exits an aisle through the same end of the aisle, without fully traversing the aisle, as shown at 54 in FIG. 7. The shopper path shown in FIG. 7 includes three separate excursions 54.

Loitering pattern 56 is typically formed when a shopper remains in generally the same area for a period of time, indicated by a close cluster of detected positions 33. This typically occurs when a shopper is contemplating the purchase of a product, but may also occur when a shopper stays in one place for any reason for a length of time, or when the shopper abandons a cart.

Figure 6:
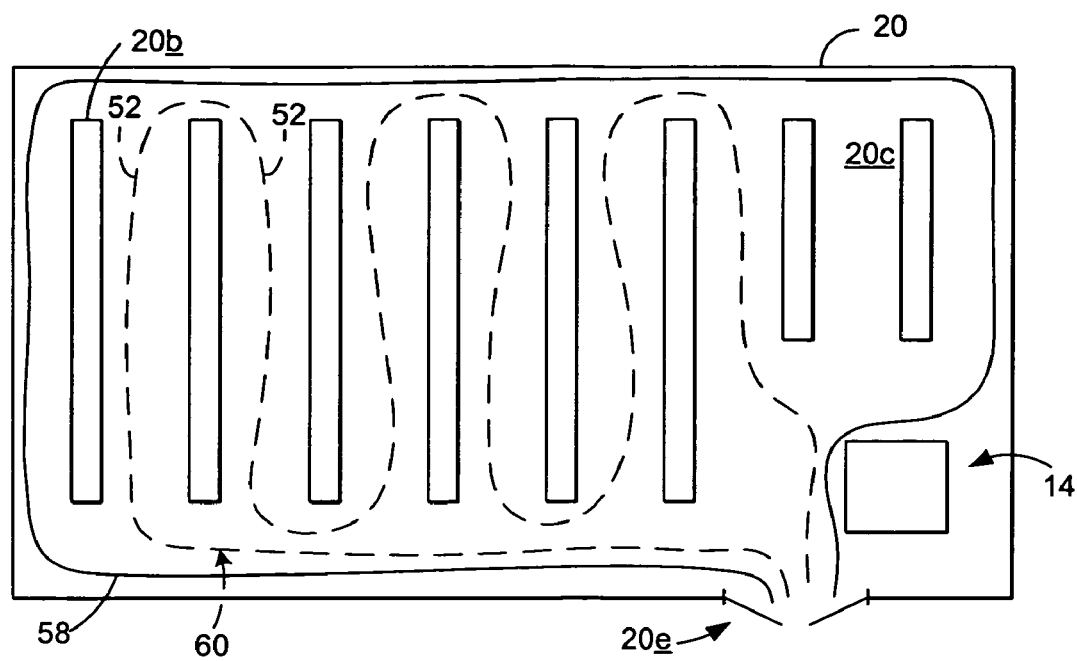
FIG. 6 is a schematic view of shopper paths exhibiting a perimeter pattern and a zigzag pattern.

As shown in FIG. 6, the data analyzer may also be configured to recognize a perimeter pattern 58, in which the shopper path encircles substantially all of a perimeter of the shopping environment. Data analyzer 16 may also be configured to recognize a zigzag pattern 60. Zigzag pattern 60 typically is formed by a shopper fully traversing a plurality of aisles in a back and forth manner, entering and exiting each aisle through opposite ends of the aisle, such that the final shopper path resembles a zigzag pattern. It will be appreciated that each zigzag pattern 60 is formed from a plurality of aisle-traverse patterns 52.

Figure 7:
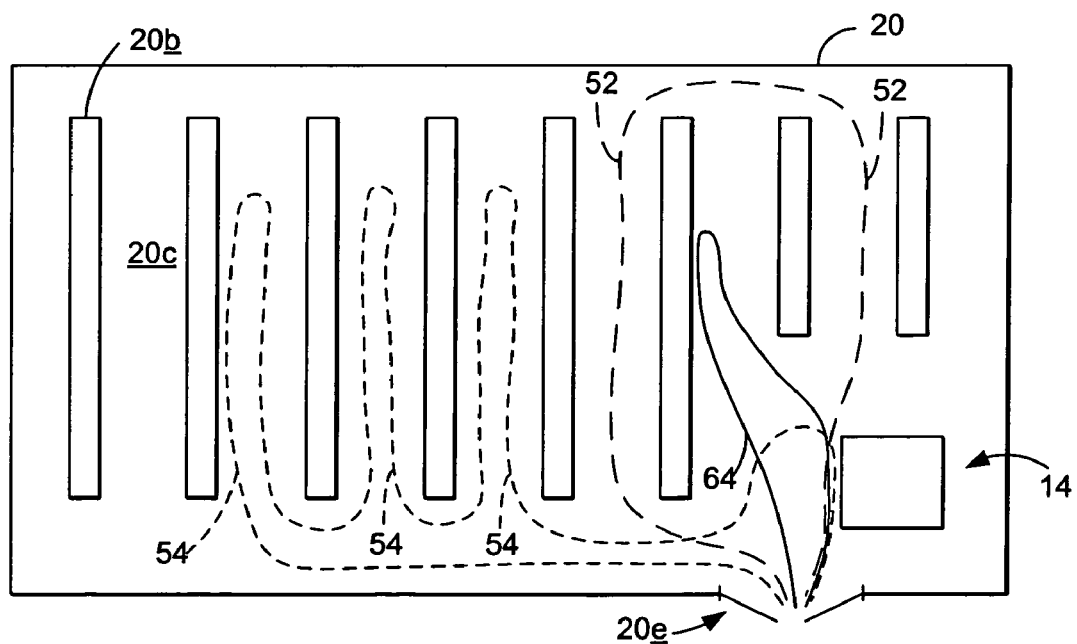
FIG. 7 is a schematic view of shopper paths exhibiting an excursion pattern, an aisle traverse pattern, and a destination pattern.

As shown in FIG. 7, the data analyzer may also be configured to detect a destination pattern 64, in which the shopper path enters the shopping environment, travels to a region from which one or more products are purchased, and then travels to POS terminal 14a. Typically, only a small number of products are purchased by the shopper on a trip that includes a destination pattern.

Data analyzer 16 may also be configured to recognize patterns based on the time duration of the shopping trip as well as the physical location of the shopper path. Typically, the data analyzer is configured to measure the time duration of each shopper path, and determine whether the time duration of the shopper path is within one or more predetermined time ranges, for example, a quick trip range, fill-in trip range, routine trip range, and stock-up trip range. Typically, the quick trip range is less than about 10 minutes, the fill-in trip range is between about 10 and 20 minutes, the routine trip range is between about 20 and 45 minutes, and the stock-up trip range is over about 45 minutes. Of course, it will be appreciated that data analyzer 16 may be configured to recognize a wide variety of time-based trip classifications, and the above described durations are given for exemplary purposes only.

Figure 8:
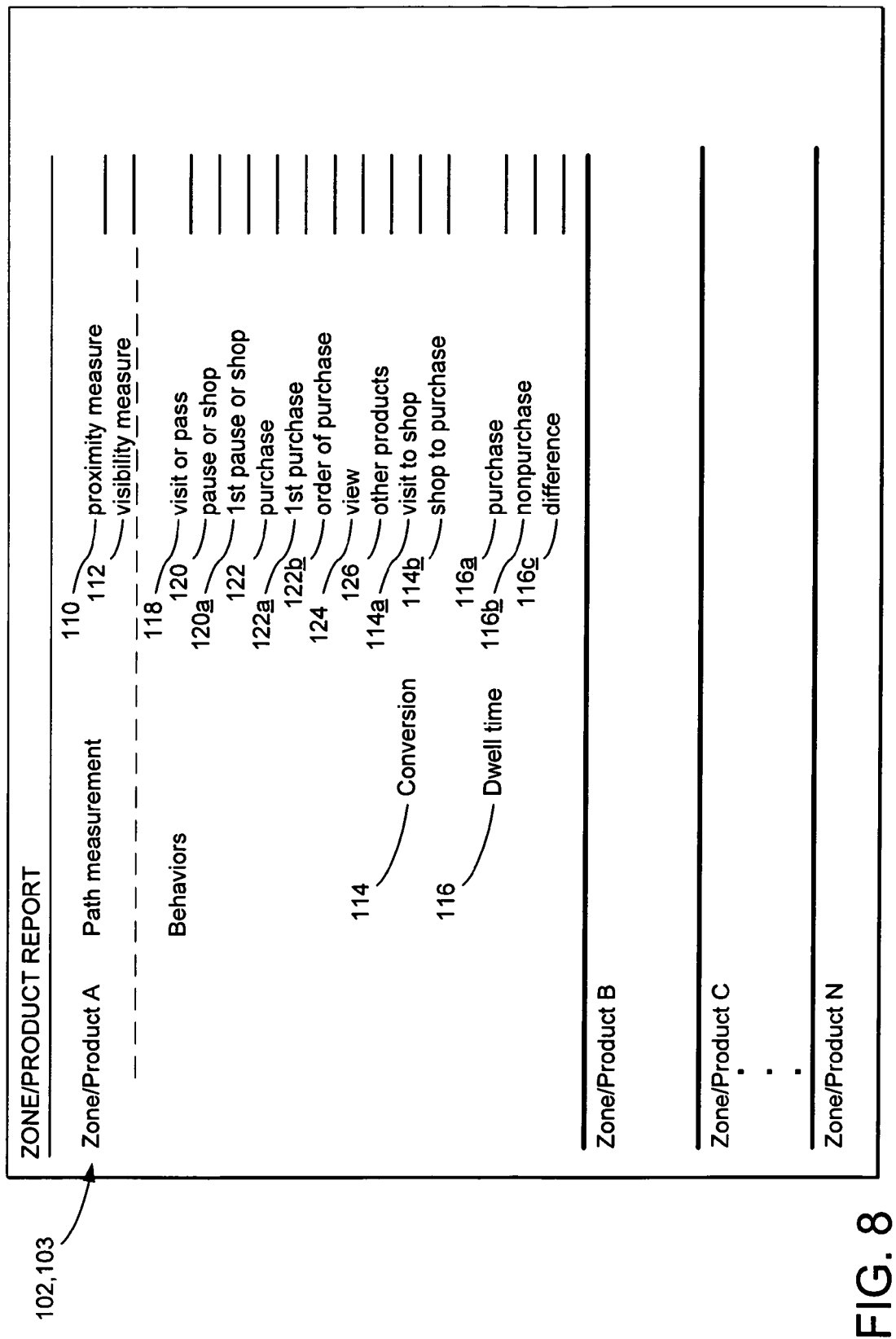
FIG. 8 is a schematic view of a data compilation according to one embodiment of the present invention.

FIG. 8 depicts a data compilation according to one embodiment of the present invention, shown generally at 100. Data compilation 100 includes various statistics for a plurality of products 102, e.g., Swiss cheese, milk, etc. While typically the compilation is arranged according to products 102, alternatively the data compilation may be arranged according to zones or subzones 103. The zones or subzones may correspond to a particular product category, and therefore the compilation alternatively may be said to be arranged according to product category, such as "cheeses," or "dairy products." Alternatively the zones may correspond to a physical portion of shopping environment 20, such as the entrance/exit.

Data compilation 100 further includes path measurement statistics 106 and behavior statistics 108. Path measurement statistics 106 may include a shopper-product proximity measure 110 and a shopper-product visibility measure 112. The proximity measure is typically calculated by determining whether the shopper travels within the zone or predefined region adjacent a product. Data analyzer 16 is configured to make this determination by detecting that a portion of the shopper path lies within the predefined region.

Visibility measure 112 is typically a measure based in part on a simulated visibility of the product from a field of view of the shopper, or alternatively from a line of sight of the shopper, as the shopper travels along the shopping path. Thus, proximity measure 110 and visibility measure 112 are an indication the percentage or number of shoppers that see or pass within a predefined region associated with a product. The visibility measure is typically defined by the equation:

$$\text{Visibility measure} = \text{Sum}(1 \text{ to } z) \frac{[(\text{pass})(t)(\sin\theta_s)(\sin\theta_a)]}{D^2}$$

where Sum(1 to z) is the sum of all zones from which the zone for which the visibility measure is being calculated can be seen, pass is the percentage of shoppers who pass through each summed zone, t is the time shoppers spent in each summed zone, $\sin \theta_s$ is the sine of the angle from a line of dominant flow of shopper traveling through the "seeing" zone, $\sin \theta_a$ is the sine of the angle of the display to the line of sight, and D is the distance between the two zones. FIG. 4 illustrates the angles represented by $\theta_s$ and $\theta_a$, and the distance represented by D. It will be appreciated that a wide variety of other methods may be used to calculate the visibility measure.

Behaviors 108 include a wide variety of behaviors, including the shopper being physically present within the predefined region (VISIT OR PASS) 118, the shopper slowing down or stopping within the predefined region (PAUSE OR SHOP) 120, the shopper purchasing a product within the predefined region (PURCHASE) 122, and the shopper viewing a product within the predefined region (VIEW) 124. To determine whether the shopper is physically present in the predefined region at 118, the data analyzer 16 is configured to detect whether the shopper path passes through the predefined region. Thus, even if a detected position 33 of the transmitter 30 is not within the predefined region, the shopper may be presumed to have passed through the predefined region if the shopping path passes through the predefined region.

To determine if a shopper slows down at 120, data analyzer 16 is configured to detect if the shopper speed falls below a predetermined threshold within the predefined region. Slowing down is one indication that a shopper is "shopping," that is, is looking at a potential product that the shopper might wish to purchase. The predetermined threshold may be a relative decrease in speed, for example, if the shopper speed slows down by more than 20% in the predefined region as compared to an entry speed. Alternatively, the threshold may be an absolute speed below which the shopper is said to be slowing down, for example, less than 0.25 meters per second. The shopper may be determined to be "pausing" or "stopping" if two successive detected positions 33 of transmitter 30 are in substantially the same location.

To determine whether a product was purchased within the predefined region as indicated at 122, the data analyzer 16 is typically configured to examine the purchase data 24 (i.e., record 204) associated with the shopping path 38, in order to detect whether any products from the predefined region were purchased by the shopper. Typically, purchase measure 122 is a measure of all persons who purchase a particular product from the predefined region. Alternatively the purchase measure may be a measure of all persons who purchase any product from a given predefined region. Where the report is directed to a particular product, such as Swiss cheese, the report may include the percentage or number of purchasers of Swiss cheese who also purchased other products from the predefined region, such as cheddar cheese, as shown at 126.

In addition to the statistics shown at 118, 120, 122, and 124, the data compilation 100 typically further includes a first pause or shop measure 120a, a first purchase measure 122a, and an order of purchase measure 122b. The first pause or shop measure is typically a measure of the number or percentage of shoppers who first slow down or stop in a particular predefined region. For example, 8% of shopper may first slow down during their shopping trips in the predefined region surrounding the beer cooler. The first purchase measure is typically a measure indicating the percentage or number of shoppers who first purchased a product from a particular predefined region on a particular shopping trip. For example, the report may indicate that 6% of shoppers first purchased beer on their shopping trips to the shopping environment. Order of purchase is a measure indicating the relative order of a given purchase on a shopping trip. Typically the order of purchase measure is expressed on a scale of 1 to 10, such that a score of 2 indicates that a particular product or products from a particular zone are on average purchased earlier in a shopping trip, while a score of 8 indicates that the product(s) are on average purchased later in a shopping trip.

Data compilation 100 further includes other behaviors 108 such as conversions 114 and dwell times 116. Conversions 114 include a visit to shop measure 114a that indicates the percentage or number of shoppers who "converted" from being visitors to a region to "shoppers" in a region, that is, the percentage of shoppers who actually slowed down or paused within the predefined region divided by the percentage or number who entered the predefined region. This measure may be used to evaluate the effectiveness of a product display, advertising, or promotional item, for example. Conversions 114 may also include a shop to purchase measure 114b that indicates the number or percentage of shoppers that "converted" from shopping (i.e. slowing or pausing) in a predefined region to purchasing a product in the predefined region. Thus, the shop to purchase conversion measure 114b is typically calculated by dividing the number or percentage of shoppers who purchased a product in the predefined region, indicated at 122, by the number or percentage of shoppers who paused or shopped in the predefined region, indicated at 120.

Data compilation 100 also typically includes a plurality of dwell times 116, which generally indicate the amount of time shoppers spent in each predefined region. Dwell times 116 typically include purchase dwell time 116a, which indicates the amount of time purchasers of products in a predefined region spent in the predefined region; nonpurchaser dwell time, which indicates the amount of time nonpurchasers of products in a particular predefined region spent in the predefined region; as well as the difference 116c between the amount of time purchasers and nonpurchasers of products from a particular predefined region spent in the region.

Data compilation 100 may also include information on patterns detected in the shopper paths, including spatial patterns, such as the zigzag pattern, excursion pattern, loiter pattern, destination pattern, perimeter, and aisle-traverse pattern described above, as well as time-based patterns such indications of the percentage and number of shopper paths that fall within the quick trip range, fill-in trip range, routine trip range, and stock-up trip range discussed above.

Figure 9:
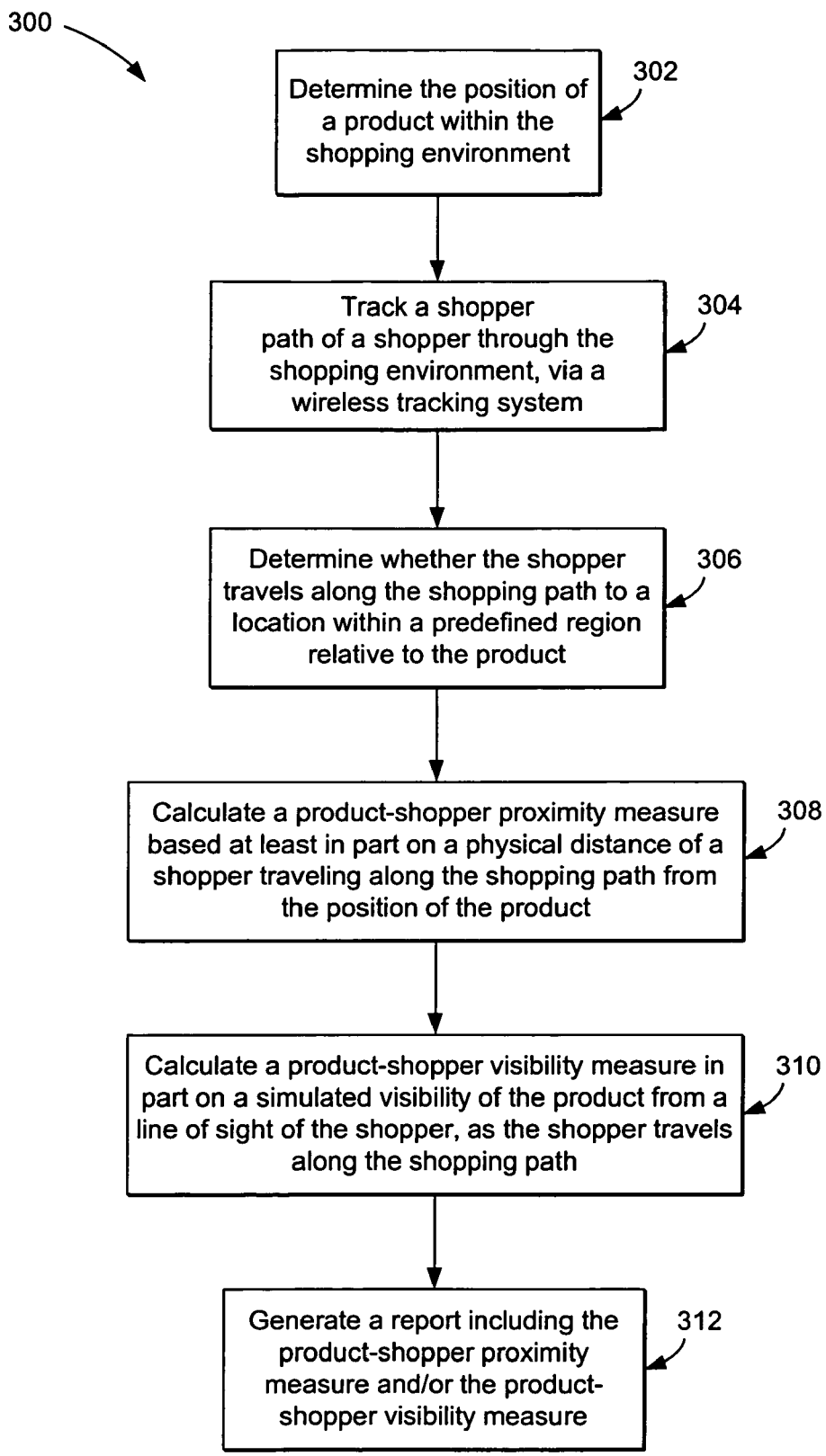
FIG. 9 is a flowchart of a method according to one embodiment of the present invention.

Turning now to FIG. 9, a method according to one embodiment of the present invention is shown generally at 300. Method 300 includes determining the position of a product within a shopping environment, at step 302. Typically, the positions of each product are recorded, in three dimensions, by a scanning device that is operated by a user traversing the shopping environment. Alternatively, the product positions may be recorded in only two-dimensions, or may be recorded in three dimensions in another manner, for example, by using a tape measure to record a height of each product. A record of these product positions is made, and the predefined regions are defined around certain products or groups of products.

At 304, method 300 includes tracking the shopper path of a shopper through the shopping environment with a wireless tracking system, as discussed above. The shopper path is typically tracked by detecting a periodic wireless tracking signal 34 from a transmitter attached to a surrogate for the shopper, such as a cart. From these signals, a series of coordinates for the shopper position are typically calculated, depending on relative signal strength, phase difference, or other signal characteristics. Tracking the shopper path typically includes reconstructing a shopping path from the coordinates, as described above. The method may further include detecting that at least a portion of the shopper path exhibits at least one of the following patterns: zigzag pattern, excursion pattern, loiter pattern, destination pattern, and aisle-traverse pattern, described above.

At 308, method 300 includes calculating a product-shopper proximity measure 110 based at least in part on a physical distance of a shopper traveling along the shopping path from the position of the product. The physical distance may be a measured distance D between the product and the shopper path, or the physical distance may be defined by a predefined region 42, discussed above. Thus, the product-shopper proximity measure may be a measure of the percentage of number of shopper paths that pass within a predefined region around a particular product, or that pass within a predetermined distance D of a product.

At 310, the method further includes calculating a product-shopper visibility measure based in part on a simulated visibility of the product from a field of view or line of sight of the shopper, as the shopper travels along the shopping path. From this measure, it may be estimated how long a particular product was visible to a shopper. The field of view may be of varying scope and typically faces parallel to the velocity vector of the shopper traveling along the shopping path, as discussed above.

At 312, the method may further include generating a report that includes the product-shopper proximity measure and/or the product-shopper visibility measure. The report is illustrated at 100 in FIG. 8. The report may also include the various behavior statistics 108 described above.

Figure 10:
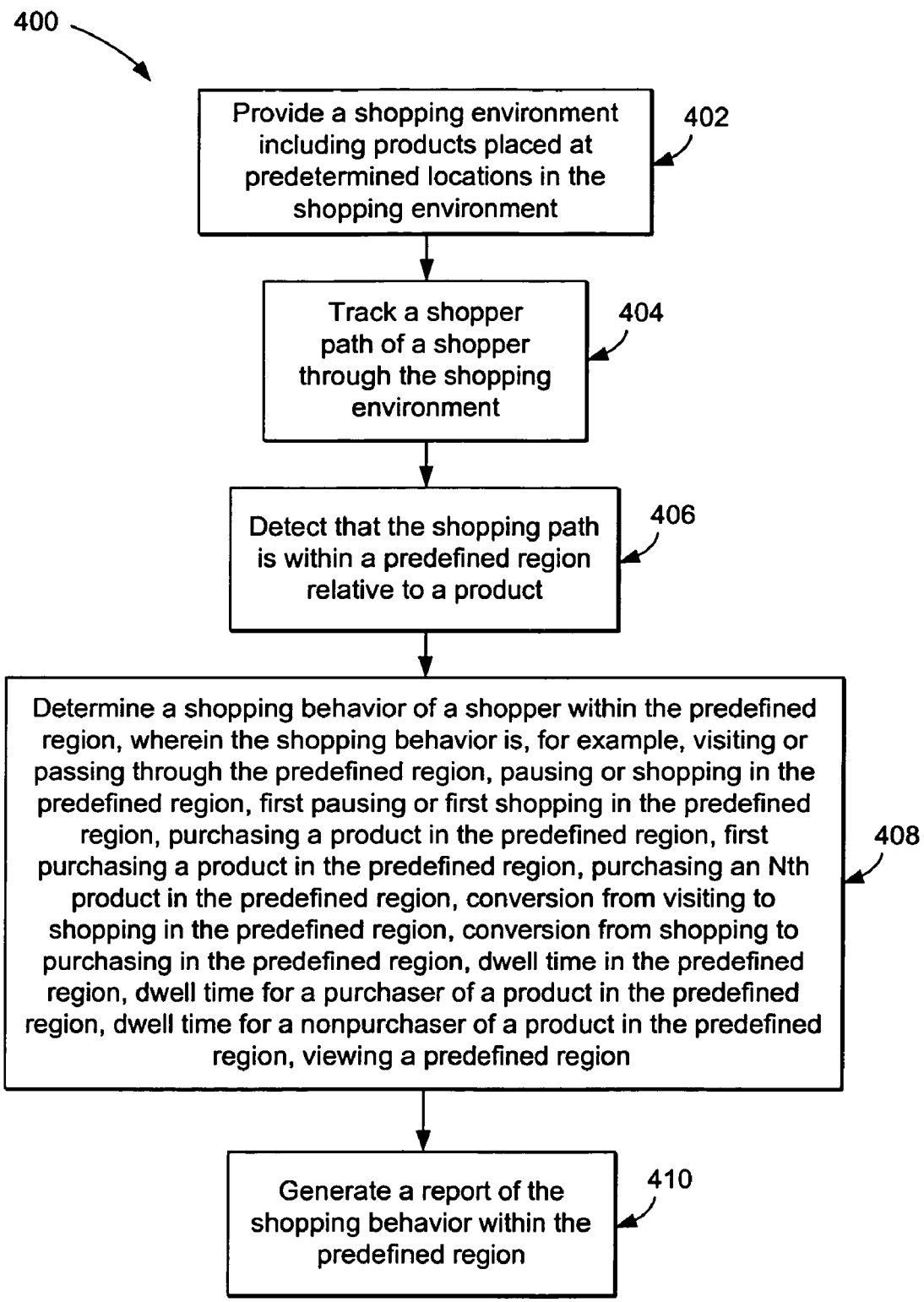
FIG. 10 is a flowchart of a method according to another embodiment of the present invention.

In FIG. 10, a method according to another embodiment of the present invention is shown generally at 400. Method 400 includes providing a shopping environment including products placed at predetermined locations in the shopping environment, at step 402. At 404, method 400 includes tracking a shopper path of a shopper through the shopping environment, as described above. The method may further include detecting that at least a portion of the shopper path exhibits at least one of the following patterns: zigzag pattern, excursion pattern, loiter pattern, destination pattern, and aisle-traverse pattern, described above. At 406, the method typically includes detecting that the shopping path is within a predefined region associated with one or more products, as described above.

At 408, the method further includes determining a shopping behavior of a shopper within the predefined region. The shopping behavior may be, for example, visiting or passing through the predefined region, pausing or shopping in the predefined region, first pausing or first shopping in the predefined region, purchasing a product in the predefined region, first purchasing a product in the predefined region, purchasing an Nth product in the predefined region, conversion from visiting to shopping in the predefined region, conversion from shopping to purchasing in the predefined region, dwell time in the predefined region, dwell time for a purchaser of a product in the predefined region, dwell time for a non-purchaser of a product in the predefined region, and/or viewing a predefined region or any of the various other behaviors 108, as described in detail above.

At 410, method 400 further includes generating a data compilation, also referred to as a report, of the shopping behavior within the predefined region. The report may take the form shown in FIG. 8, and may be product specific, zone (i.e., predefined region) specific, category or any other merchandising relevant grouping. The data compilation may be in print form, such as a book or binder of printouts, or in electronic form, such as a computer-readable file encoded on a CD-ROM, DVD-ROM or other media.

Figure 12:
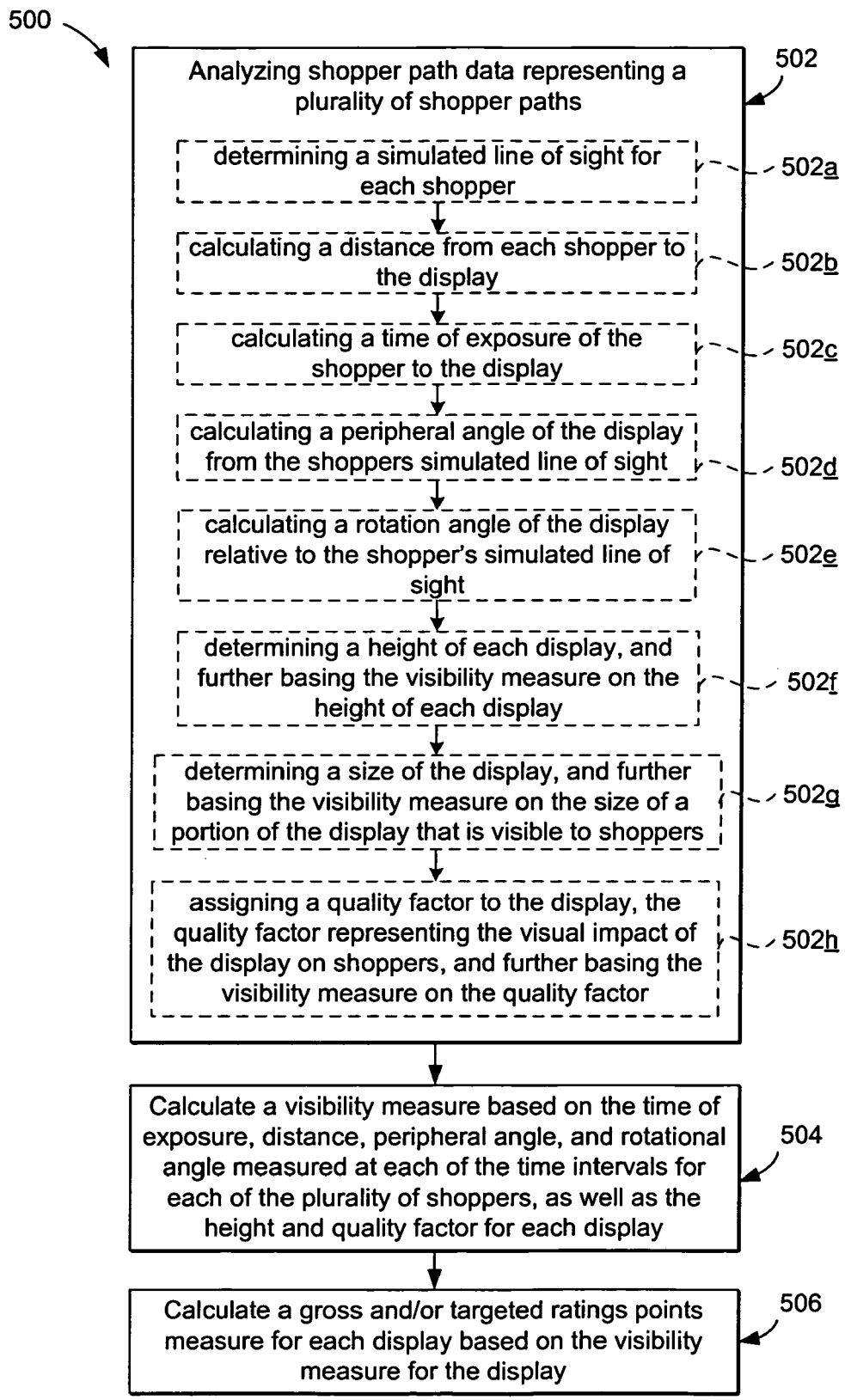
FIG. 12 is a flowchart of a method according to another embodiment of the present invention.
Figure 15:
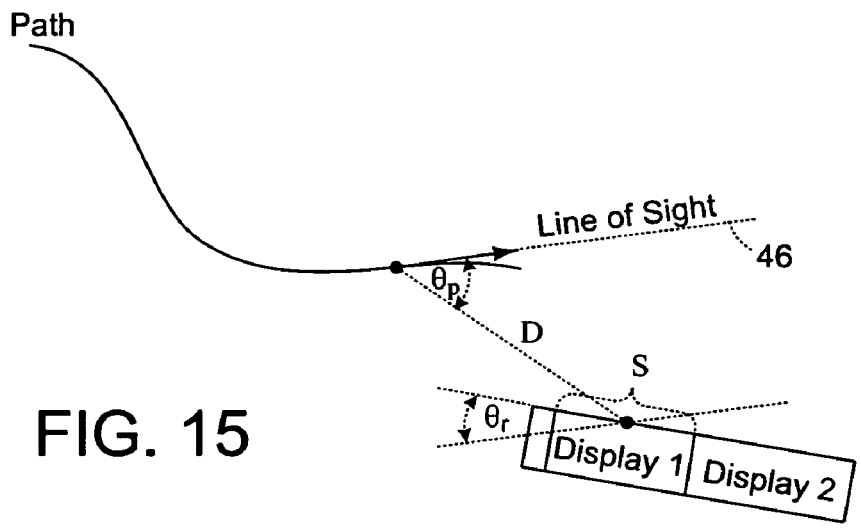
FIG. 15 is a schematic diagram of a shopper path, showing the relative position of a display to a first position on the shopping path.
Figure 16:
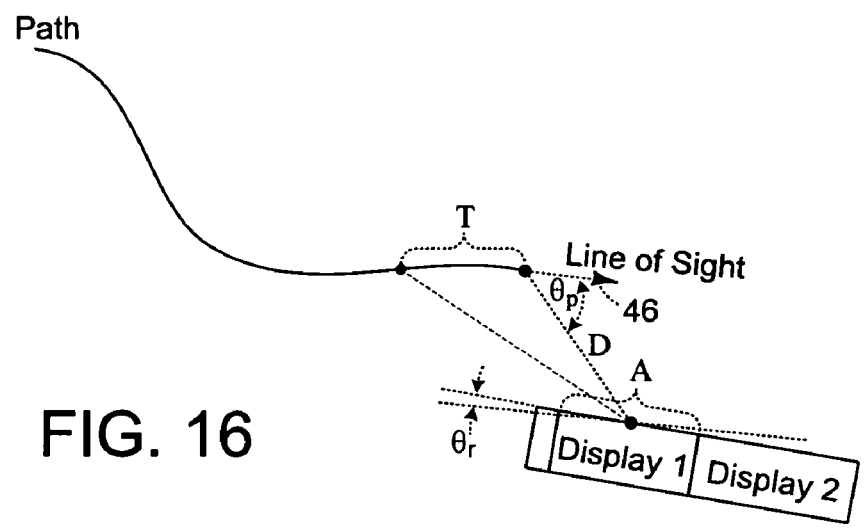
FIG. 16 is a schematic diagram of a shopper path, showing the relative position of a display to a second position on the shopping path.

FIG. 12 illustrates a market research method 500 according to another embodiment of the present invention. FIGS. 15-16 illustrate exemplary shopper paths as analyzed by the method of FIG. 12. As shown at 502 in FIG. 12, the method includes analyzing shopper path data representing a plurality of shopper paths through a store or other display environment. The step of analyzing shopper path data may include one or more sub-steps 502a-502h that are performed at predetermined time intervals, for each of a plurality of shoppers traveling through the store, and for each of one or more displays positioned in the store.

As shown at 502a-b, the analysis may include determining a simulated line of sight, illustrated at 46 in FIGS. 15-16, for each shopper, and calculating a distance from the shopper to the display, illustrated at D in FIGS. 15-16. The line of sight is typically determined to be a line tangent from a midpoint of the display to the shopper path, and pointing in the direction of travel of the shopper.

As shown at 502c, the method may further include calculating a time of exposure of the shopper to the display. This time of exposure may be, for example, the time within which the display falls within a simulated field of view of the shopper. The simulated field of view may be determined as described above with reference to FIG. 4, for example. Further, as shown at 502d-e, the method may include calculating a peripheral angle, illustrated at $\theta_p$ in FIGS. 15-16, of the display from the shopper's simulated line of sight, and calculating a rotation angle of the display relative to the shopper's simulated line of sight, illustrated at $\theta_r$ in FIGS. 15-16.

Figure 17:
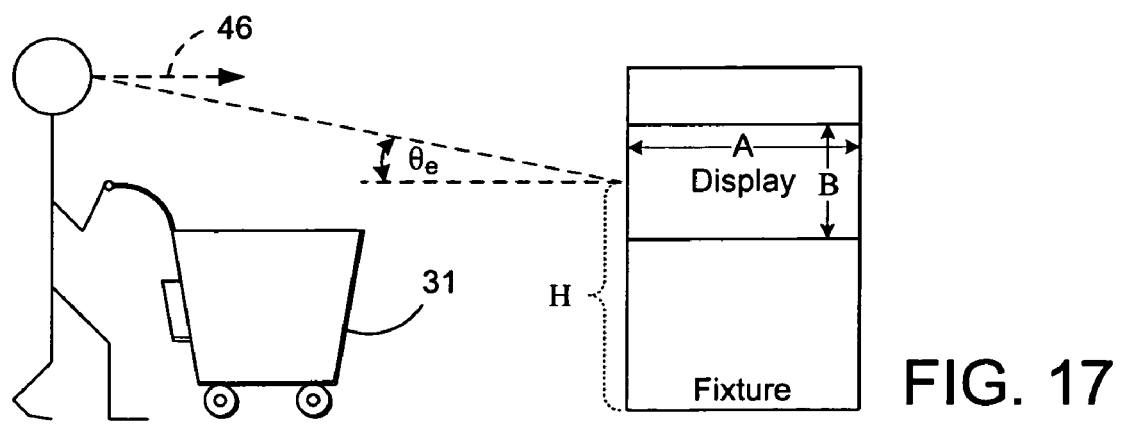
FIG. 17 is a schematic diagram of a product display contained within a store fixture, showing height and area of the display.

As shown at 502f, the method may further include determining a height of each display, and further basing the visibility measure on the height of each display. As illustrated in FIG. 17, a height H may be measured to a midpoint, or other predetermined reference point on each display. The height of the display may be factored into the visibility measure, for example, by calculating an elevation angle of the display above or below a height of the simulated line of sight of the shopper observing the display, as illustrated at $\theta_e$ in FIG. 17, and further by weighting the visibility measure by the elevation angle, such that the greater the elevation angle from the line of sight, the lower the visibility measure. In this case, the height of the line of sight for each shopper is typically approximated to a predetermined average line of sight height for all shoppers. Alternatively, varying heights for the line of sight of each shopper may be taken into account. This may be achieved, for example, by approximating the height of each shopper using video analysis of the shopper traveling on the shopping path.

At 502g, the method further includes determining a size of the display that is exposed to the shopper, and further basing the visibility measure on the size of the portion of the display that is visible to the shopper. The size may be a single dimension (e.g. a lateral or width dimension) such as width A illustrated in FIGS. 16 and 17, or may be two dimensional (e.g., an area) such as the area AxB illustrated in FIG. 17, or even may be three-dimensional.

At 502h, the method may further include assigning a quality factor to the display, the quality factor representing the visual impact of the display on shoppers, and further basing the visibility measure on the quality factor. The quality of the display may be a subjective factor used to simulate the relative ability of displays of different visual impact to attract the eye of the shopper. For example, bright colors or interesting designs may be coded to have a high quality score, while colors and patterns that blend in with a background environment may have a low quality factor.

At 504, the method may include calculating a visibility measure based on the time of exposure, distance, peripheral angle, and rotational angle measured at each of the time intervals for each of the plurality of shoppers, as well as the height and quality factor for each display. One example of a sample formula that may be used to calculate the visibility measure follows.

$$\text{Visibility measure} = \text{Sum}(1 \text{ to } z) \frac{[(\text{pass})(t)(\sin\theta_p)(\sin\theta_r)(\sin\theta_e)(\text{Size})(Q)]}{D^2}$$

where Sum(1 to z) is the sum of all zones from which the display for which the visibility measure is being calculated can be seen, pass is the percentage of shopper paths that pass through each summed zone, t is the time of exposure to the display for each shopper in the summed zone, $\sin \theta_{p\_}$ is the sine of the peripheral angle of the display from the shopper's simulated line of sight, $\sin \theta_r$ is the sine of the rotation angle of the display relative to the shopper's simulated line of sight, $\sin \theta_e$ is an elevation angle of the display above or below a height of the simulated line of sight of the shopper observing the display, Size is the size of the display, Q is a quality factor for the display, and D is the distance from the summed zone to the display. It will be appreciated that a wide variety of other methods may be used to calculate the visibility measure at 504.

The visibility measure calculated at 504 typically is based on shopper data representing a large number of shoppers, typically hundreds or thousands, traveling through a given store, although smaller sample sizes may also be used. Typically, the simulated line of sight and field-of-view for each shopper may be calculated from the entry to the exit (or seating in the case of a restaurant, etc.) of the store, at predetermined intervals such as 5 second intervals, or other suitable interval. At each point in time, the shopper's field of view may be estimated by a measured direction of movement between a prior location and a subsequent location. Thus, for each of a plurality (e.g., nine in the example shown in FIGS. 18-19) of displays in the store, a series of visibility measures may be continuously computed.

In addition, within a particular store or set of stores, the visibility measure for each display may be indexed to an average visibility measure for all displays in the store or set of stores; for example, the average visibility measure for displays in a store may be rated at 100, and the visibility measure for each individual display may be indexed relative to the average. In addition, the visibility measure may be computed on an absolute basis to allow comparisons across stores. It will further be appreciated that averages may be computed for like sections of similar stores (e.g., the meat department, or the checkout area) or for similar stores as a whole, and visibility measures for displays of different stores may be computed relative to a cross-store average.

As shown at 506, the method may further include calculating one or more ratings points measures for each display based on the visibility measure for each display. The ratings points measures may, for example, be targeted ratings points measures for all displays within a predefined store or set of stores, or may be gross ratings points measures for wider application across a region-wide or nation-wide chain of stores, for example.

For example, an in-store rating points measure may be calculated for each display. To calculate the in-store rating points measure, a finite unit of advertising exposure is typically established. For example, one unit of advertising exposure may be computed as equivalent to one shopper being exposed to a 5 sq. ft. display directly on the line of sight, directly facing the patron, from a distance of 5 feet for a duration of 5 seconds. Of course, it will be appreciated that these specific values are merely exemplary and a wide variety of other values may be used, so long as a standardized value is selected for each of the variables (distance, relative angle, display size, duration of exposure) being used to calculate the visibility measure.

Further, the in-store ratings points measure may be converted to a region-wide ratings points measure, by projecting from the in-store shopper count to the total shopper count in stores across a region. Thus, a rating points measure may be calculated for a city, state, nation, or entire world. For large areas such as a nation or the entire world, the term gross ratings points measure is used, while for more focused areas such as a city or state, the term targeted ratings points measure is used.

Figure 13:
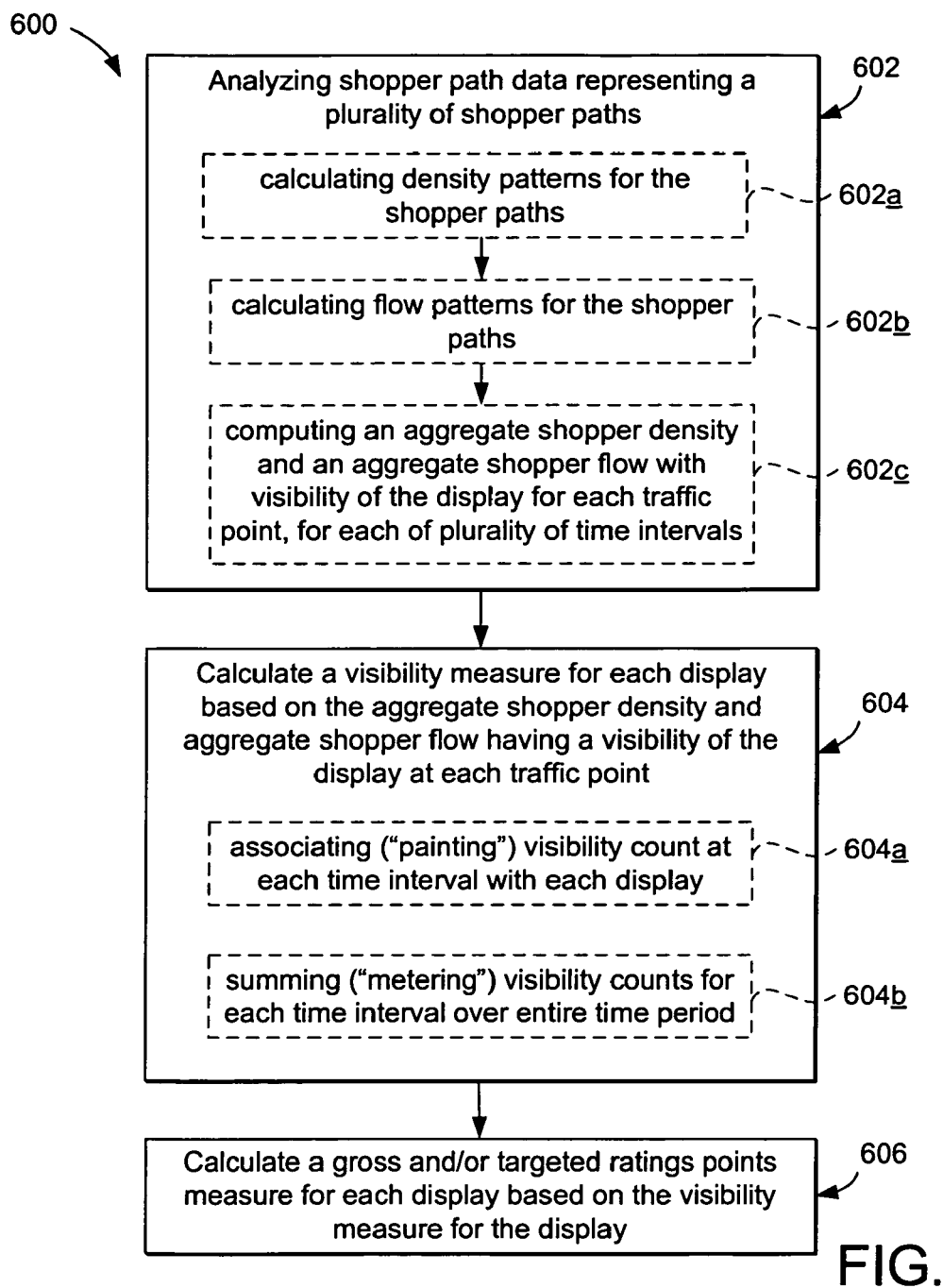
FIG. 13 is a flowchart of a method according to yet another embodiment of the present invention.

FIG. 13 illustrates a market research method 600 according to another embodiment of the present invention. The method typically includes, at 602, analyzing shopper path data representing a plurality of shopper paths through a store or other display environment, by calculating density patterns for the shopper paths (step 602*a*) and calculating flow patterns for the shopper paths (step 602*b*), and aggregating shopper density and shopper flow at traffic points that have visibility of a display (step 604*c*). Suitable systems and methods for computing traffic points are described in parent application U.S. patent application Ser. No. 11/179,306, the disclosure of which is herein incorporated by reference. Suitable systems and methods for computing shopper density and flow are described in parent application, U.S. patent application Ser. No. 10/667,213, the entire disclosure of which is herein incorporated by reference.

Figure 14:
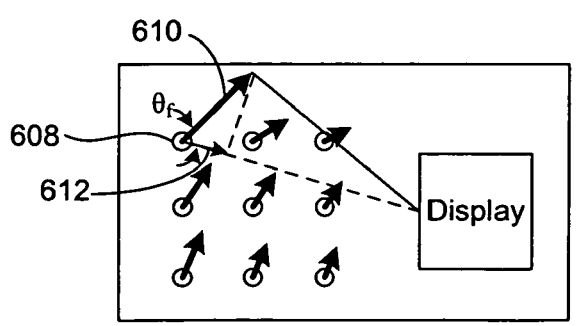
FIG. 14 is a schematic diagram illustrating shopper density and shopper flow calculated using traffic points, according to the method of FIG. 13.

As shown in FIG. 14, a grid of traffic points 608 may be laid out over a store map. Shopper paths that pass through a zone adjacent each traffic point are summarized at the traffic point for purposes of computation. The number of shoppers passing through a given zone in a time interval may be summed at the traffic point, and used to calculate aggregate shopper density. After computing the aggregate shopper density at each traffic point at a given point in time, an aggregate flow in a direction with visibility of each display may be computed for each traffic point. For this calculation, shopper paths that are traveling (i.e., facing) in a direction away from the display are typically ignored, since the display does not fall within their simulated field of view. In FIG. 14, the direction of each vector 610 represents the aggregate shopper flow with visibility of the display at each traffic point 608, while the length of the vector represents the aggregate shopper density.

As shown at 604, the method further includes calculating a visibility measure for each display based on the aggregate shopper density and aggregate shopper flow having a visibility of the display at each traffic point. For each traffic point, at each point in time, the density multiplied by the flow of shopper paths facing a display results in a visibility count for that display at that point in time. As shown at 604*a*, in a process referred to as "painting," the visibility count for each traffic point at each time interval may be associated with each display, and as shown at 604*b*, in a process referred to as "metering," the visibility counts are summed for each display over time to result in a cumulative visibility measure for each display. At 606, a gross and/or targeted ratings points measure for each display may be calculated based on the visibility measure for the display.

For example, out of 100 measured shopper paths, an aggregate number of 10 shopper paths (10% density) may travel through a traffic point in a given time interval, and 50% of those may have a flow direction that is facing the display, resulting in 5 shopper paths for which the display is visible. In the calculation at 604a, these 5 shopper paths would constitute a visibility count that is "painted to" or associated with the display for that traffic point at that point in time. One exemplary calculation that may be used to calculate the visibility count is to calculate the size of a component vector 612 extending along a line from the traffic point to the midpoint of the display, for the aggregate vector 610. In the calculation at 604b, for each display the visibility counts are summed from all of the traffic points over a cumulative time period (comprising plurality of the discrete time intervals). The sum of these visibility counts may be included in the visibility measure calculated at 604, which in turn forms the basis for the ratings points measure calculated at 606.

It will be appreciated that method 600 operates on an audit principle, counting a number of shoppers who appear at a given traffic point during a given time interval. While method 600 typically does not measure the amount of time a particular shopper views a particular display, as in method 500, it will be appreciated that a shopper who spends twice as long in a traffic point zone is twice as likely to be counted in a snapshot count using the audit method of method 600. Therefore, the number of times a shopper is recorded in a particular zone via the audit method of method 600 will be proportional to the actual time the shopper spends in the zone. For this reason, summing a series of such snapshot counts will typically yield satisfactory shopper density measures.

One example formula for the visibility measure calculated at 604 follows.

$$\text{Visibility measure} = \text{Sum}(1 \text{ to } z) \frac{[(DEN)(\cos\theta_f)(\text{Size})(Q)]}{D^2}$$

where Sum(1 to z) is the sum over all relevant time intervals of 1-z traffic points from which the display for which the visibility measure is being calculated can be seen, DEN is the aggregate density of shoppers at each traffic point (either relative percentage or absolute number of shoppers), $\cos\theta_f$ is the cosine of the angle of the flow line relative to the line connecting the traffic point to a mid-point of the display, Size is the size of the display, Q is a quality factor assigned to the display, and D is the distance from the traffic point to the display. It will be appreciated that a wide variety of other methods may be used to calculate the visibility measure at 604.

Example

FIGS. 18 and 19 illustrate a schematic map and a data table showing visibility measures for nine displays within an example convenience store. Based on the traffic and displays in a single store, it is apparent from the graph that the third and fourth order counters receive the highest exposure in the store, which is 1.7 times the average for all displays in this store. The first and second order counter receive closer to the average exposure of 100 for displays in this store. The fourth order counter, which is the largest of the four counter displays, receives the highest visibility measure of the four counter displays; however, the third order counter also receives a high visibility measure despite its small size, perhaps due to the flow of traffic within the store. The soda displays are close to the average exposure of 100, with the right soda display receiving about 25% more than the left soda display.

The first large display to the immediate right of the patrons as they enter the store and approach the order counter receives only 15% of the normal exposure for a display of this size, while the second display beside and closer to the order counter receives three times the exposure, but still less than half the average for a display. The large menu board behind the counter receives 76% of the exposure of the average display, even though it is very much larger than the other displays. This may be due to the substantial distance of this display from the patrons, even at their closest approach.

Based on the results for the store of FIGS. 18-19, the gross ratings points measure for all stores in the same chain across the United States may be calculated. By way of example, the table employs calculations to find a rating of 14 gross ratings points, based on the measured number of patrons over a specified time period, assuming 1000 patrons per day, for 28 days, in 5000 stores projected to a national population of 200 million. When the targeted population is limited to patrons for only one store of this chain, the targeted rating points may be measured as 572,605, representing the reach and frequency the displays in just one store in the chain.

It will be appreciated that the above described methods and systems may be used not only for in-store analysis, but also for tracking observers of displays that are positioned outside of a store. For example, the systems and methods described herein may be applied to outdoor tracking and measuring of visibility measures for store signage, billboards and other outdoor displays. Thus, it will be appreciated that the terms "shopper" and "shopper path" described above, may alternatively be expressed as "observer" and "observer path." It will also be appreciated where the sine of an angle is referenced above, the cosine of the angle or other trigonometric substitute may alternatively be used, as appropriate for ease of computation, in order to compute a component vector of extending towards a display along the peripheral, rotational, eyesight, and flow angles.

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

I claim:

1. A market research method, comprising:
   at an analysis program executed on a computing device, analyzing path data representing a plurality of observer paths through a display environment, the analysis including, at predetermined time intervals, for each of a plurality of observers traveling through the display environment, and for each of one or more displays positioned in the display environment:
   determining a distance from each observer to the display;
   determining a direction of travel for each observer, the direction of travel defining a simulated line of sight for each observer; and determining a degree to which the observer's simulated line of sight faces the display; and calculating a visibility measure for each display, based on the distance from the observer to the display at each time interval, and the degree to which the observer's simulated line of sight faces the display at each time interval;

wherein the visibility measure is calculated according to the formula:

$$\text{Visibility measure} = \frac{\text{Sum}(1 \text{ to } z)[(\text{pass})(t)(\sin\theta_p)(\sin\theta_r)(\sin\theta_e)(\text{Size})(Q)]}{D^2};$$

wherein Sum(1 to z) is a sum of all zones from which the display can be seen;

wherein pass is a percentage of observers who pass through each summed zone;

wherein t is a time of exposure to the display for each observer in the summed zone;

wherein $\sin\theta_p$ is the sine of a pheripheral angle of the display from each observer's simulated line of sight in the summed zone;

wherein $\sin\theta_r$ is the sine of a rotation angle of the display relative to each observer's simulated line of sight in the summed zone;

wherein $\sin\theta_r$ is the sine of an elevation angle of the display above or below a height of the simulated line of sight of each observer observing the display from the summed zone;

wherein Size is a size of the display;

wherein Q is a quality factor for the display; and wherein D is the distance from the summed zone to the display.

2. The method of claim 1, wherein the analysis further includes, at each of the predetermined time intervals, for each of the plurality of observers traveling through the display environment, and for each of the one or more displays positioned in the display environment:

calculating a time of exposure of the observer to the display;

calculating a peripheral angle of the display from the observer's simulated line of sight; and calculating a rotation angle of the display relative to the observer's simulated line of sight;

the method further comprising, for each of the one or more displays, calculating a visibility measure based on the time of exposure, distance, peripheral angle and rotational angle measured at each of the time intervals, for each of the plurality of observers.

3. The method of claim 1, wherein the analysis further includes, at each of the predetermined time intervals, for each of the plurality of observers traveling through the display environment, and for each of the one or more displays positioned in the display environment:

computing an aggregate observer density and an aggregate observer flow with visibility of the display for each of a plurality of traffic points.

4. The method of claim 3, wherein the step of calculating the visibility measure further includes calculating a visibility measure for each display based on the aggregate observer density and aggregate observer flow having a visibility of the display at each traffic point.

5. The method of claim 4, wherein the step of calculating the visibility measure further includes associating a visibility count at each time interval with each display, and summing the visibility counts for the plurality of time intervals;

wherein the visibility count at each time interval is based on the aggregate observer density and aggregate observer flow having a visibility of the display at each traffic point.

6. The method of claim 1, further comprising, calculating a ratings points measure for each display based on the visibility measure for the display.

7. The method of claim 6, further comprising:

calculating an average ratings points measure for the displays, and expressing the ratings points measures for each display on a scale that is based on the average ratings points measure.

8. A market research method, comprising:

at an analysis program executed on a computing device, analyzing shopper path data representing a plurality of shopper paths through a store, the analysis including, at predetermined time intervals, for each of a plurality of shoppers traveling through the store, and for each of one or more displays positioned in the store:

determining a simulated line of sight for each shopper;

calculating a distance from each shopper to the display;

calculating a time of exposure of the shopper to the display;

calculating a peripheral angle of the display from the shopper's simulated line of sight;

calculating a rotation angle of the display relative to the shopper's simulated line of sight;

for each of the one or more displays, calculating a visibility measure based on the time of exposure, distance, peripheral angle and rotational angle measured at each of the time intervals, for each of the plurality of shoppers;

wherein the visibility measure is calculated according to the formula:

$$\text{Visibility measure} = \frac{\text{Sum}(1 \text{ to } z)[(\text{pass})(t)(\sin\theta_p)(\sin\theta_r)(\sin\theta_e)(\text{Area})(Q)]}{D^2};$$

wherein Sum(1 to z) is a sum of all zones from which the display can be seen;

wherein pass is a percentage of shoppers who pass through each summed zone;

wherein t is a time of exposure to the display for each shopper in the summed zone;

wherein $\sin\theta_p$ is the sine of the pheripheral angle of the display from each shopper's simulated line of sight in the summed zone;

wherein $\sin\theta_r$ is the sine of the rotation angle of the display relative to each shopper's simulated line of sight in the summed zone;

wherein $\sin\theta_e$ is the sine of an elevation anile of the display above or below a height of the simulated line of sight of each shopper observing the display from the summed zone;

wherein Area is an area of the display;

wherein Q is a quality factor for the display; and wherein D is the distance from the summed zone to the display.

9. The method of claim 8, further comprising:

determining a size of the display, and further basing the visibility measure on the size of a portion of the display that is visible to shoppers.

10. The method of claim 9, wherein the size is a lateral dimension of the display.

11. The method of claim 9, wherein the size is a two dimensional area of the display.

12. The method of claim 8, further comprising:
determining a height of each display, and further basing the visibility measure on the height of each display.

13. The method of claim 8, further comprising:
assigning a quality factor to the display, the quality factor representing a visual impact of the display on shoppers, and further basing the visibility measure on the quality factor.

14. The method of claim 8, wherein the quality factor is chosen based on a color of the display.

15. The method of claim 8, wherein the time of exposure is calculated by determining a simulated field of view based on the determined line of sight, and calculating a time interval during which the display is within the simulated field of view.

16. The method of claim 8, further comprising:
prior to analyzing the shopper path data,
identifying a position of the one or more displays within the store;
tracking shoppers on the plurality of shopper paths through the store, via a computerized tracking system, to thereby generate the shopper path data.

17. The method of claim 9, further comprising:
calculating a ratings points measure for each display based on the visibility measure for the display.

18. The method of claim 17, further comprising:
calculating an average ratings points measure for the displays, and expressing the ratings points measures for each display on a scale that is based on the average ratings points measure.

19. The method of claim 17, wherein the ratings points measure is an in-store ratings points measure.

20. The method of claim 17, wherein the ratings points measure is a targeted ratings points measure based on data from a plurality of stores in a targeted region.

21. The method of claim 17, wherein the ratings points measure is a gross ratings points measure based on data from stores nation wide.

* * * * *